July 9, 1935.  F. M. CLARK  2,007,792
ELECTRIC DEVICE AND DIELECTRIC MATERIAL THEREFOR
Original Filed Sept. 29, 1932
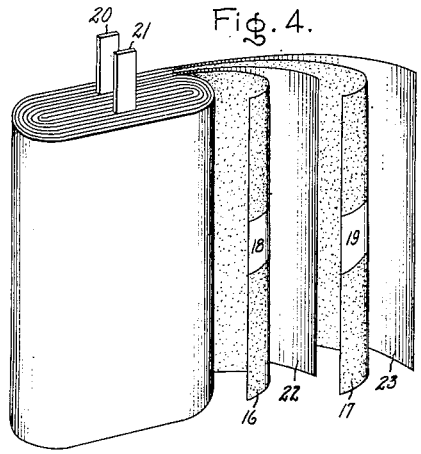
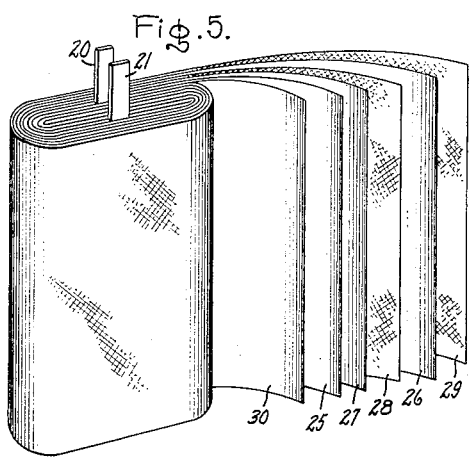
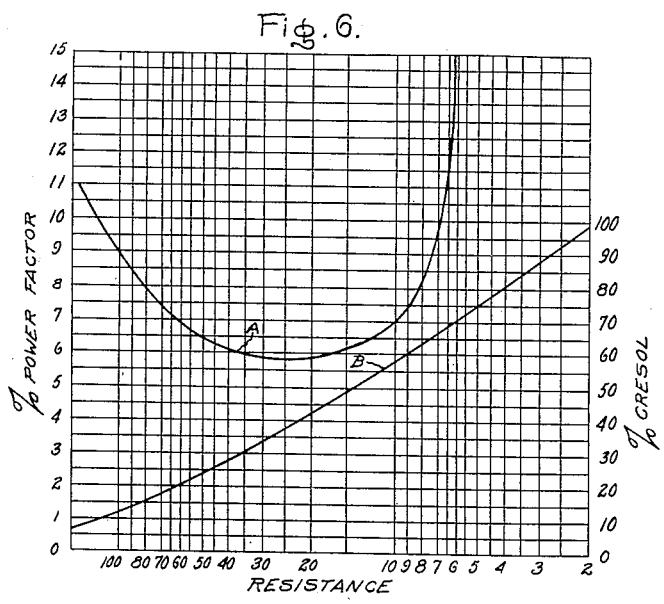
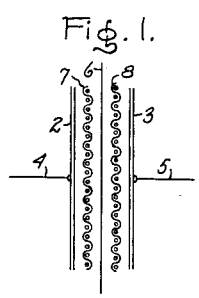
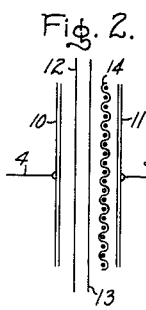
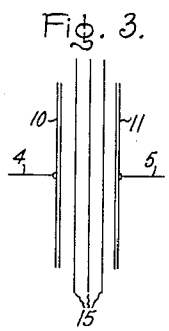
Inventor:
Frank M. Clark,
by Charles V. Tullar
His Attorney.

Patented July 9, 1935

2,007,792

UNITED STATES PATENT OFFICE 2,007,792

ELECTRIC DEVICE AND DIELECTRIC MATERIAL THEREFOR

Frank M. Clark, Pittsfield, Mass., assignor to General Electric Company, a corporation of New York Original application September 29, 1932, Serial No. 635,388. Patent No. 1,966,163, dated July 10, 1934. Divided and this application February 14, 1933, Serial No. 656,686

4 Claims. (Cl. 175—41)

The present application is a division of my prior application Serial No. 635,388, filed Sept. 29, 1932 which has matured into U. S. Patent 1,966,163, patented July 10, 1934. The latter application is a continuation in part of my application Serial No. 572,523, filed November 2, 1931, which has matured into U. S. Patent 1,966,162, patented July 10, 1934. The present divisional application relates to dielectric compositions and to electric capacitors and to other electrical devices containing insulating and dielectric materials embodying a void-filling agent consisting of a liquid organic phthalate and a resistance-modifying ingredient. Its object is to improve the efficiency of such devices, and in particular to provide an improved impregnating composition the use of which in a capacitor is accompanied by low power factor.

Heretofore, it has been believed to be necessary in the fabrication of capacitors which are provided with paper dielectric to employ a plurality of superimposed sheets of paper. The use of three sheets of paper rendered it extremely unlikely that conducting particles which may be present accidentally in each sheet would be in exact superimposed relation thus practically precluding short-circuiting by such particles and avoiding undue conduction losses.

The electric capacity of a capacitor unit has been expressed as follows by the United States Bureau of Standards:

$$C = 0.0885 \frac{(N-1)KS}{T}$$

C is capacity in micro microfarads; K is specific inductive capacity; S is the surface (in square centimeters); T is the distance between electrode plates in centimeters; N is the number of capacitor armatures or plates. A decrease in the space factor T obviously will increase C, the electric capacity.

While I have provided a highly efficient type of capacitor in which the high capacity characteristic of a super-thin dielectric may be secured without the accompanying danger of short-circuiting and other disadvantages resulting from conducting particles which may be accidentally present in the paper or other dielectric, my invention is not limited in its field of usefulness to a super-thin paper, or other high resistance septum, or sheet material.

The improved dielectric composition embodying my present invention may be employed in connection with a composite dielectric in capacitors which is constituted in part of a high resistance septum, such as paper, nitro-cellulose, mica, or other high resistance material. It has sufficient conductivity to function as though constituting an extension or part of one or both of the capacitor armatures. In effect the armatures are separated only by a thin septum and consequently as high a capacity is obtained as would be obtained if the paper or other septum alone were present. The resistance of the composite dielectric of my present invention, however, is too high to permit undue leakage current to take place through it, should one or more conducting particles be present in the high-resistance septum. As such dielectric, termed herein for convenience as a semi-conductor, I prefer to employ a non-aqueous organic mixture of suitable resistivity and specific inductive capacity one of the ingredients of which is an alkyl phthalate. When the resistivity of such semi-conductor consisting of an alkyl phthalate, which is of relatively high resistivity and a second material which is of lower resistivity, is chosen as by properly proportioning such ingredients to fall within a range discovered by me, which is below the value regarded heretofore as practical (as explained hereinafter) then energy loss in a capacitor containing such semi-conductor is materially decreased. While low energy loss can be obtained over a lowered range of resistivities as experimentally determined, for still lower resistivities of the semi-conductor below said range the energy loss again rises. This newly discovered phenomenon, whereby low energy loss is obtained with a resistivity which is lower than formerly was associated with high energy loss has been termed both in my prior Patent 1,966,163, and herein, as the "energy loss depression effect."

In order to insure the presence of a distinct film or layer of semi-conductor, there is preferably employed a spacing means adjacent at least one of the armatures, as for example, a porous fabric or other porous mineral material, such as an oxide coating on either one or both of the armatures. Over any range of spacing distances practical for capacitor manufacture the capacity is substantially independent of the thickness of the semi-conductor layer. Structural features of capacitors embodying my invention, particularly structures embodying a spacing means are claimed in my Patent 1,966,162. In this patent generic claims also are made covering compositions of which the composition herein claimed constitutes a specific embodiment.

In the accompanying drawing Figs. 1, 2 and 3 are diagrammatic representations of capacitors embodying my invention; Fig. 4 is a perspective view of a coiled-type capacitor, shown partly unrolled, and containing an oxide coating as a spacing means; Fig. 5 is a perspective view of a coiled-type of capacitor, shown partly unrolled and containing a fibrous, porous material as a spacing means; and Fig. 6 is a graph showing the relation of the resistivity of a semi-conductor forming part of a capacitor dielectric and the dielectric losses (plotted as per cent power factor). The same figure also contains a graph showing the relation of resistivity to various mixtures of tricresyl phosphate and cresol.

Referring to Fig. 1, the capacitor there diagrammatically represented comprises the usual armatures, or plates, 2 and 3, to which terminal conductors 4 and 5 are attached. Between these armatures is located a septum 6 of material of high electrical resistance, as for example, paper, and preferably a dense or imperforate paper. As above stated, this septum may consist of a single sheet of paper having a thickness of about .4 mil (0.0004"). For some purposes two or more sheets of paper may be preferable. Kraft paper suitable for the purposes of my invention is described in United States Patent to Amos L. Allen, No. 1,850,702, dated March 22, 1932.

Between armature 2 and the septum 6 are spacers 7, 8 which may consist of a very porous medium, that is, a material having numerous interstitial spaces, such, for example, as cheesecloth, porous kraft paper, blotting paper, muslin, silk, absorbent wood pulp fibre, or the like. Ordinarily a cloth spacer of a thickness of about four to seven mils is suitable. Cheese-cloth having a thread count of 20 x 12 and a thickness of about 5 mils is satisfactory for this purpose. When the armatures or plates consist of aluminum, I prefer to employ as the spacing means a porous mineral layer on one or both of the plates. An oxide layer which is porous may be produced in accordance with my prior Patent 1,846,844, dated February 23, 1932, (Reissue Patent No. 18,833).

Although very definite advantages accrue from the use of a single sheet of paper, using a spacing medium between each armature and the paper, in some cases other advantages may be gained by using two, or even three sheets of paper. One such arrangement is shown in Fig. 2, the armature plates being numbered 10, 11, and two paper layers being numbered 12, 13. A single spacer 14 is provided. The added sheets of paper lower the capacity of a given unit but raise the voltage range for which the capacity unit may be employed. In some cases the spacer may be entirely omitted, as shown in Fig. 3. In that event preferably three sheets of paper 15 are employed.

As a semi-conductor for the use above indicated my experiments have shown that I may employ a liquid or a liquid mixture having a conductivity within the range of about $1 \times 10^6$ to $1 \times 10^8$ ohms per centimeter cube at 25° C., the particular resistivity depending on the properties of the specific material employed, the construction and other conditions of any chosen capacitor.

In general I employ a mixture consisting on the one hand of a material of high resistivity and good dielectric properties, which may be conveniently designated as group A, of which tricresyl phosphate, triphenyl phosphate, dibutyl phthalate, trichlor benzene, and mineral oil, are examples, and on the other hand modify this material with a second material of relatively lower resistivity (or better conductivity), designated as group B, of which cresol, phenol, alpha naphthylamine, beta naphthol, aniline, acetic acid, dinitrobenzene, or furfural, are examples.

A mixture by weight of about 60 parts dibutyl phthalate and 40 parts cresol has a resistivity when measured at 25° C. by the application of nine volts direct current of about $1 \times 10^7$ ohms per centimeter cube.

In some cases a thickening material may be added to produce a solid or semi-solid, semi-conductor. A mixture by weight of 62 parts tricresyl phosphate, 33 parts cresol and 5 parts of shellac, the latter constituting the thickening material, results in a semi-solid material. The percentage of shellac can be increased if desired to form a more nearly solid material. For example, I may use by weight 44 parts of tricresyl phosphate, 44 parts cresol and 12 parts shellac. Various combinations of one or more of group A and one or more of group B materials may be used for the purposes of my invention.

In some cases the conductivity of the group A product may be modified by heating to produce decomposition for the purpose of lowering the electrical resistivity. Apparently by the heat treatment, pyrogenic decomposition products result which are of the character of the group B products. For example, an organic phosphate such as tricresyl phosphate or triphenyl phosphate may be heated at a temperature of 100° C. or higher. The length of heating depends on the temperature and initial purity of the material.

In some cases advantages may be obtained by using combinations of different kinds of paper. Kraft paper particularly, when combined with linen or cotton paper, results in a lower power factor than linen or cotton paper alone. While the capacity is decreased somewhat it is higher than the capacity obtained by using the same thickness of kraft paper.

Although in the illustrative examples particular reference has been made to tricresyl phosphate, and triphenyl phosphate, other esters, as for example tributyl phosphate, can be similarly heat-treated with corresponding beneficial results.

In capacitors intended for operation on alternating current circuits, it is important to secure not only maximum capacity with a unit of given size but also minimum energy loss, as expressed by power factor. As later explained, under some conditions a high capacity may be utilized even through the accompanying power factor is high. The minimum power factor may be obtained by a selection of conductivity of the semi-conductor in the composite dielectric.

In Fig. 6 the relation of power factor and resistivity of an impregnating liquid comprising a tricresyl phosphate and cresol mixture is represented by graph A, the abscissæ of which are resistivity values and the ordinates power factor values. The resistance values are plotted on logarithmic scale as ohms per centimeter cube when multiplied by $10^6$. The lower power factor values are obtained when the resistivity of this semi-conductor falls with a range of $1.4 \times 10^7$ to $4.5 \times 10^7$ ohms per centimeter cube. In the case of a mixture of tricresyl phosphate and cresol, this range corresponds to a cresol content falling roughly in the range of about 25 to 50% by weight. As will be seen from the curve a power factor below 10% may be obtained by the use of any mixture of these substances yielding a resistivity from about $7 \times 10^6$ to $1 \times 10^8$ ohms per centimeter cube. The relation of cresol content to resistance is indicated by the graph B, the ordinates for which are shown in the right hand scale.

The dielectric constant is substantially constant over the prefered range of tricresyl phosphate-cresol mixtures, being about 7. The electric capacity of a given capacitor unit does not vary substantially with variations of cresol content in a range of 25 to 50%.

The capacitors may be assembled by rolling, stacking or otherwise, as well understood in the art. In Fig. 4 is shown one representative construction. Strips 16, 17 of aluminum foil are oxidized chemically or electrolytically. Preferably a track as indicated at 18 and 19 in the respective sheets is left unoxidized. The track may be coated, prior to the oxidizing treatment, with some inert protective material, such as nitrocellulose, such material later being removed. These unoxidized tracks render it convenient to make electrical contact between the terminals 20, 21, and the armatures 16, 17. Paper sheets 22, 23 act as the septum as explained in connection with Fig. 1, kraft paper being preferred.

In the structure shown in Fig. 5 a fibrous spacer, such as cheese cloth, is employed. The capacitor armatures or plates are constituted by strips of aluminum foil 25, 26. Between these two foil strips is a paper septum 27 and a cloth spacer 28. On the opposite side of the foil 26 is a cloth spacer 29 and on the opposite side of the foil 25 is a paper strip 30. When these strips are wound, the plates, spacer and septum are brought into proper relation as indicated in Fig. 1. Terminals 20 and 21 contact with the armatures 25 and 26. The assembled units are impregnated by immersion in the liquid semiconductor.

Illustrative figures of capacity and power factor for capacitors containing respectively kraft, linen and cotton papers have been given above. In general the more porous the paper or other septum, the higher is the capacity but such high capacity is coupled with a correspondingly high power factor. Cotton paper being the most porous gives the highest capacity and power factor. When cotton paper is calendered, making it more dense, the capacity and power factor are reduced.

As above explained, combinations of a dense septum, such as kraft paper and a porous material, which acts as a spacer, are preferred, and such combinations give the best combination of favorable capacity and power factor, the capacity being unaffected by the thickness of the spacer between practical limits. I have employed spacers ranging in thickness from .3 to 5 mils.

The improved results obtained by the practice of my invention may be noted from the following comparative figures.

A given capacitor of standard construction employing three sheets of $\frac{1}{10}$ mil kraft paper as the dielectric septum when impregnated with mineral wax has a volume of 5.4 cubic inches for a capacity of one microfarad. Expressed otherwise said capacitor having a volume of one cubic inch would have a capacity of .185 m. f. When impregnated with mineral oil such a capacitor requires a slightly greater volume, namely about 6 cubic inches.

However, when the given unit is impregnated with a mixture of 65 parts tricresyl phosphate and 35 parts cresol a capacity of one microfarad is obtained for a volume of .45 cubic inch, which corresponds to a capacity of 2.22 m. f. per cubic inch. The volume required for a given capacity is reduced to less than one tenth of the wax combination. In other words, for a capacitor of one cubic inch volume, the electric capacity is increased 12-fold. The power factor while being increased still is favorable being less than five per cent.

When a septum of one sheet of .4 mil kraft paper and a spacer of oxide film on aluminum plates is employed a volume of only .2 cubic inch is required for a capacity of one microfarad. The power factor is less than five per cent. If higher power factor values are permissible for good performance, as would be the case for some capacitor uses on direct current circuits, then still greater capacity for unit volume may be obtained.

What I claim as new and desire to secure by Letters Patent of the United States, is:—

1. An electric capacitor comprising armatures, cellulosic sheet material interposed therebetween and a medium impregnating said paper consisting by weight of about 60 parts dibutyl phthalate and of about 40 parts cresol.

2. An electric capacitor comprising armatures, a composite dielectric therebetween including an absorbent septum of dielectric material and an impregnating medium therefor containing substantial amounts respectively of dibutyl phthalate and cresol, said ingredients being proportioned to produce in said impregnating medium a resistivity of about $1 \times 10^7$ ohms per centimeter cube when measured at 25° C. by the application of nine volts direct current.

3. In a capacitor, an impregnating composition consisting essentially of dibutyl phthalate and a non-aqueous, organic material of materially lower resistivity, said ingredients being proportioned to result in a composition having a resistivity within an energy loss depression range.

4. In a capacitor, an impregnating composition consisting of dibutyl phthalate and cresol said ingredients being proportioned to result in a composition having a resistivity within an energy loss depression range.

FRANK M. CLARK.

Certificate of Correction

Patent No. 2,007,792. July 9, 1935.

FRANK M. CLARK

It is hereby certified that errors appear in the printed specification of the above numbered patent requiring correction as follows: Page 2, second column, line 54, for "through" read *though*; and line 67, for "107" read $10^7$; and that the said Letters Patent should be read with these corrections therein that the same may conform to the record of the case in the Patent Office.

Signed and sealed this 20th day of August, A. D. 1935.

[SEAL]

LESLIE FRAZER,
*Acting Commissioner of Patents.*